United States Patent [19]
Cohn et al.

[11] Patent Number: 5,299,068
[45] Date of Patent: Mar. 29, 1994

[54] GASEOUS LASER POWER LIMITER INITIATED BY NUCLEAR RADIATION

[75] Inventors: David B. Cohn, Torrance; Michael J. Nicol, Redondo Beach; Mitchell B. Haeri, Irvine, all of Calif.

[73] Assignee: Hughes Aircraft Company, Los Angeles, Calif.

[21] Appl. No.: 511,161

[22] Filed: Apr. 19, 1990

[51] Int. Cl.⁵ .......................... G02F 1/36; G02B 5/23
[52] U.S. Cl. .................... 359/886; 359/358; 356/437; 376/122
[58] Field of Search .............. 350/353, 354, 312, 314, 350/267, 1.5; 359/886, 358

[56] References Cited

U.S. PATENT DOCUMENTS

| | | | |
|---|---|---|---|
| H-001177 | 2/1992 | Kosan | 372/11 |
| 2,962,932 | 12/1960 | Kaprelian | 350/354 |
| 3,814,503 | 6/1974 | Micam | 350/363 |
| 3,815,047 | 6/1974 | Smith et al. | 330/4.3 |
| 3,986,139 | 10/1976 | Meneely et al. | 372/11 |
| 4,194,813 | 3/1980 | Benjamin et al. | 350/363 |
| 4,257,017 | 3/1981 | Bradley et al. | 330/4.3 |
| 4,829,269 | 5/1989 | Minahan | 350/354 |

*Primary Examiner*—Nelson Moskowitz
*Attorney, Agent, or Firm*—Michael W. Sales; Wanda K. Denson-Low

[57] ABSTRACT

A laser protection device employing a gas plasma switch wherein applied laser radiation is focused inside a gas chamber, and a nuclear source is employed to pre-ionize the gas volume, whereupon focused laser radiation causes gas breakdown and plasma formation that attenuates the radiation. Specifically, the invention reduces the threshold of plasma switch initiation by incorporating a nuclear source within the gas chamber that constantly injects plasma forming seed particles into the vicinity of a focused laser beam. The plasma resulting from avalanche ionization of the seed particles reflects, absorbs and deflects the laser radiation. The nuclear source introduces charged particles, excimers and metastable atoms with low ionization potential into the gas chamber. Such charged particles are effective plasma initiators because they have low ionization thresholds. The present invention has been found well suited to protect against pulsed laser sources because of fast rise times and high attenuation levels. The present invention has negligible insertion loss, fast rise time on order of 5 nsec, passive operation requiring no input power using laser initiated plasma, it operates in standby and is ready for operation at all times, and provides broadband protection for all wavelengths greater than about 1 μm.

18 Claims, 1 Drawing Sheet

GASEOUS LASER POWER LIMITER INITIATED BY NUCLEAR RADIATION

BACKGROUND

The present invention relates to optical sensor protection technology, and more particularly, to protection apparatus that may be interposed between a laser and a sensitive detector that attenuates a high intensity laser beam.

Advanced infrared sensors using sensitive detection elements are highly vulnerable to laser countermeasures. Deployable sensors, such as those used in space applictions, for example, typically require some means of protection from laser countermeasure devices. Incorporation of laser protection devices is an important design issue.

State of the art infrared sensors, such as forward looking infrared systems and range finders, are particularly vulnerable to pulsed laser countermeasures. The optical gain of these systems is typically on the order of $10^6$ so that even moderate power laser threats can permanently damage sensitive detector elements upon which scene radiation is focused. Pulsed lasers are difficult to protect against because of their fast rise times and high peak powers. In that respect, a TE (transversely excited) laser is a likely threat because of its low cost and high reliability. Such lasers typically have pulse lengths of 50 nsec to 10 $\mu$sec and peak powers of about 1 MW.

Gas plasmas initiated by focused laser radiation are known to attenuate a laser beam along the direction of propagation. This effect is useful in sensor protection in that it may be employed to limit countermeasure laser energy transmitted to sensitive detectors. Prior work has shown the usefulness of particulates to reduce the laser intensity threshold for plasma ignition with subsequent attenuation of the laser radiation. For example, see the article by Lencioni, in *Appl. Phys. Lett.*, 23, 12 (1973). In that article and in other reported work, particulates are mixed with a gas in a test cell and laser radiation is brought to a tight focus within the cell. The plasma discharge takes place at the focus. The problem with this approach is that a large number of particulates must somehow be kept in suspension in the gas to guarantee that the minimum number is suspended within the small focal volume and thus be present to initiate plasma ignition.

Schemes to keep particulates suspended include recirculating fans and flow loops that do not lend themselves to compact geometries, and which use lifetime limiting components. Alternatively, the focal spot size can be made large, but then the laser intensity threshold rises. For example, a threshold of $3 \times 10^8$ W/cm$^2$ requires a focal spot size of about 500 $\mu$m$^2$. Therefore, in order to maintain operation of the plasma switch at the relatively low flux level of $10^8$ W/cm$^2$ with a small spot size on the order of 100 $\mu$m, a means of injecting particulates directly into the focal volume is needed.

An alternative approach is described in U.S. Pat. No. 5,017,769 issued May 21, 1991 in the names of D. B. Cohn, W. Affleck and G. D. Lawrence, and assigned to the assignee of the present application. That application discloses a protection device that successfully creates a sufficient density of particulates near the focal spot to initiate plasma formation when subjected to a high power laser pulse. This was achieved via electrodes positioned adjacent to the focal point whereby a discharge of particulates from the electrodes are injected into the vicinity of the secondary focal spot. Although the protection device achieves satisfactory performance, it requires external power sources and high voltage circuits to effect particulate production and control.

Accordingly it is an objective of the present invention to provide a simplified gaseous laser power limiter that attenuates applied laser energy. It is an objective to provide a system that is fast reacting, with negligible insertion losses. It is a further objective to provide an automatic system that may be employed in a standby mode, thus requiring no separate threat warning devices. It is yet another objective to provide a system that is passive and thus dispenses with the need for external voltage sources and circuitry.

SUMMARY OF THE INVENTION

In view of the foregoing objectives, the present invention provides for a simplified laser protection device that is entirely passive in operation. The device requires no external high voltage circuitry and no external power sources. A gas plasma switch is employed wherein applied laser radiation is focused inside a gas chamber, and a nuclear source is employed to preionize the gas volume. The focused laser radiation causes gas breakdown and plasma formation in the gas chamber Specifically, the invention reduces the threshold of plasma switch initiation by incorporating a nuclear source adjacent to the secondary focal point of a focusing lens that constantly injects plasma forming particles into the vicinity of the focal point. The resulting plasma reflects, absorbs and deflects the laser radiation. The nuclear source introduces charged particles and atoms with low ionization potential into the gas chamber. Such charged particles are effective plasma initiators because they are efficient absorbers of laser radiation. The present invention has been found well suited to protect against pulsed laser sources because of fast rise times and high attenuation levels.

The present invention avoids the problems encountered in conventional laser protection devices in a compact and simple embodiment. The properties of the gas plasma switch can be summarized as having negligible insertion loss through focusing optics and gas; fast rise time on order of 5 nsec; passive operation requiring no input power; it operates in stand-by and is ready for operation at all times; and provides broadband protection for all wavelengths greater than about 1 $\mu$m.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
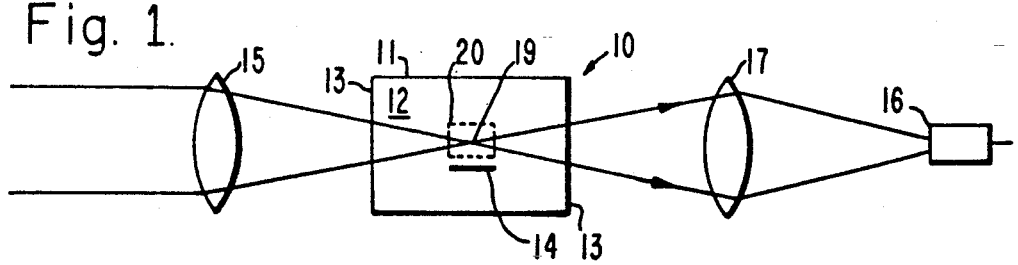
FIG. 1 illustrates a system incorporating a plasma cell in accordance with the invention.

Referring now to FIG. 1, there is shown an embodiment of a system 10 incorporating a plasma cell 11 in accordance with the principles of the present invention. The system 10 comprises the plasma cell 11 which is a high pressure vessel containing an ionizable gas 12, such as argon, for example. Opposing end walls 13 are substantially transparent to allow laser light to pass through the plasma cell 11. Substantially adjacent the center of the plasma cell 11, there is disposed a nuclear source 14 of radioactive material. Interposed between an image scene including potential laser threats and the plasma cell 11 is a first focusing lens 15. Following the plasma cell 11 is a detector 16 that is adapted to image light from the image scene. Interposed between the plasma cell 11 and the detector 16 is a second focusing lens 17 whose secondary focal plane is located at the focal plane of the detector 16.

In operation the image scene is imaged onto the detector 16 whereupon it is processed to produce a video image. A laser threat may illuminate the system 10, whereupon light from the image scene, as well as laser radiation from the laser threat, is imaged by the lenses 15, 17 onto the detector 16. The first focusing lens 15 focuses light from he image scene and laser radiation from the laser threat to a secondary focal point 19 near the center of the plasma cell 11. The second focusing lens 17 refocuses the image emerging from the plasma cell 11 onto the detector 16.

A small focal volume 20 is substantially located at the secondary focal point 19 and is characterized by a highly concentrated laser flux density. The high flux density at the focal volume 20 interacts with the ionizable gas 12 which permeates the internal volume of the plasma cell 11. It is the highly concentrated laser flux density at the secondary focus which achieves the low threshold, self-activated plasma initiation.

Disposed adjacent to the secondary focal point 19 is the nuclear source 14 which radiates atomic particles into the focal volume 20. This radiation creates electrons, particles of free argon ions, argon metastables and excimers of argon, for example, in the gas at the focal volume 20. By virtue of the concentrated flux and the particles in the gas 12, a pulse of laser radiation initiates a plasma discharge in the focal volume 20. The plasma then reflects, absorbs and refracts the threat radiation, thereby limiting the amount of threat energy incident on the detector 16. It is necessary, therefore, to have a relatively low threshold for laser induced plasma formation in order to maximize the rejection of the threat energy incident on the detector 16 prior to plasma initiation.

Figure 2:
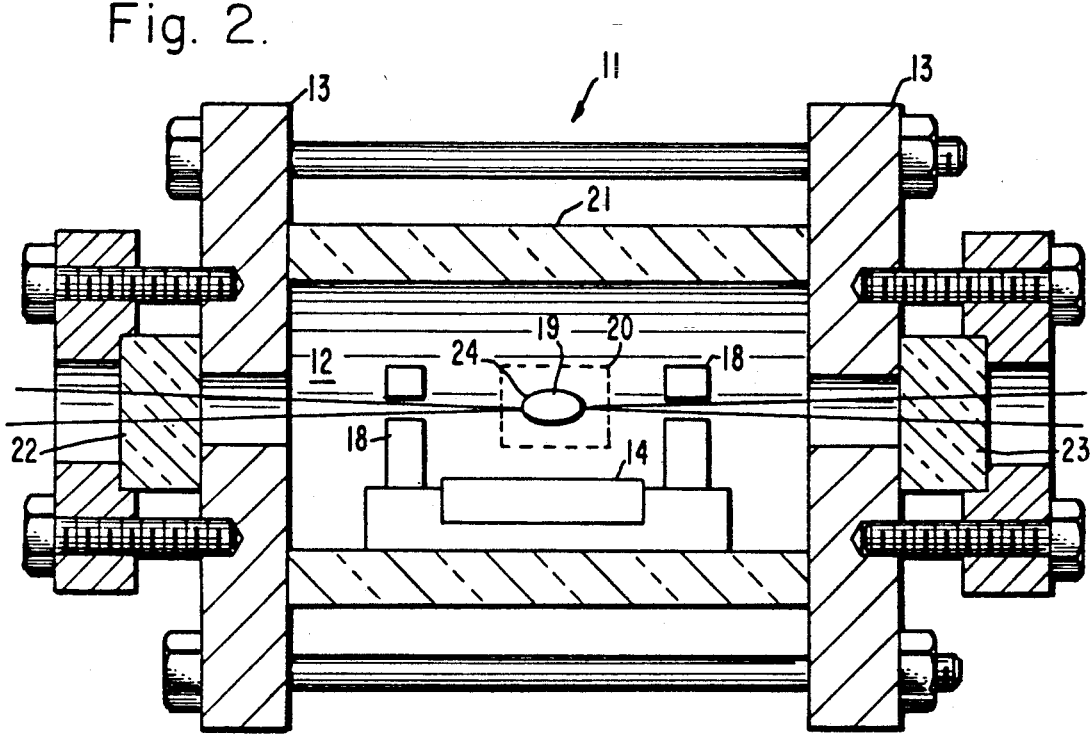
FIG. 2 illustrates an enlarged view of the laser plasma cell of FIG. 1.

Referring now to FIG. 2, there is illustrated an enlarged view of the laser plasma cell 11 of FIG. 1. The plasma cell 11 comprises a gas chamber 21 aligned with a line of sight between the image scene and the detector 16. The gas chamber 21 is sealed and contains an ionizable gas 12 such as argon, for example, under pressures up to 5 atmospheres. Windows 22, 23, adapted to be transparent to laser light and light from the image scene, are provided in opposing end walls 13 of the gas chamber 21. The windows 22, 23 may be made of a transmissive material such as zinc selenide, or the like, and may be coated with an anti-reflection coating of any conventional type to improve transmission characteristics. A pair of aperture stops 18 are disposed along the optical path. The aperture stops 18 are optional devices and are not required for operation of the laser protection device 10. The nuclear initiation source 14 is disposed substantially adjacent to the center of the gas chamber 21 and adapted to direct nuclear radiation towards the center of the gas chamber 21. The nuclear source 14 may be comprised of Nickel[63] ($Ni^{63}$) which has a net activity of 10 mC for 70 KeV electrons (source).

In operation, light from the image scene and injected laser radiation is focused to the secondary focal point 19 at the center of the gas chamber 21. The secondary focal point 19 marks the center of a focal volume 20 and is characterized by the presence of a high density laser flux concentration in addition to the ionizable gas 12. The nuclear initiation source 14 is adapted to inject particles directly into the focal volume 20.

Under the action of the continual stream of high energy electrons front the nuclear initiation source 14, the gas in the focal volume 20 is comprised of argon ions, electrons, argon metastables and excimers of argon. The net result of this background is to supply free electrons for discharge initiation and a high density of low ionization potential atoms to aid in the plasma avalanche process. The consequence is a lowering of the plasma initiation threshold compared to the case using unionized, high pressure gas and high voltage discharge. Under the action of the highly focused laser radiation and resulting electric field, the free electrons cause avalanche plasma density production by impact ionization of species having reduced ionization potential compared to neutral gas.

The net result of this process is that the laser radiation initiates a plasma cloud 24 which then prevents the laser beam from further propagation. The laser beam is reflected by the near-metallic characteristics of the plasma cloud 24, using the well known effect of radiation induced electron oscillation, which occurs for laser light oscillation frequencies below the plasma frequency. The resultant plasma cloud 24 acts as a barrier to further transmission of the laser radiation.

Figure 3:
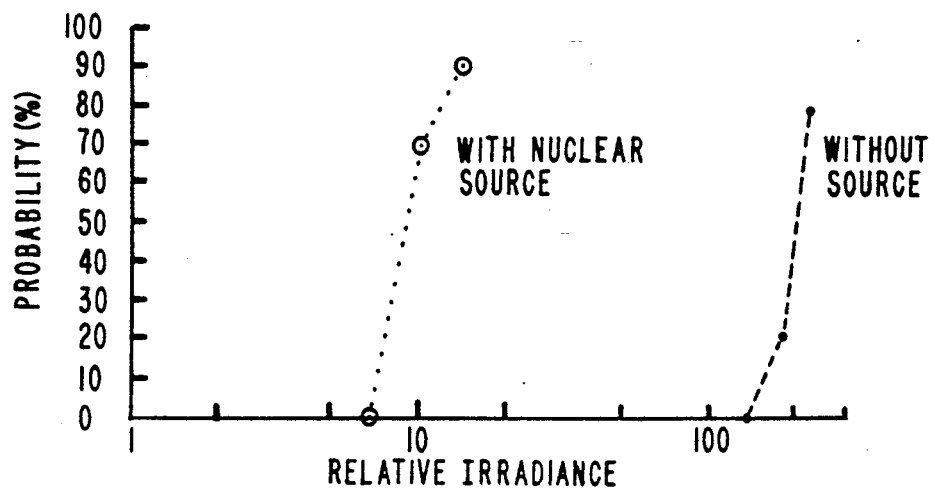
FIG. 3 is a graph showing test results illustrating the protection provided by the laser plasma cell of FIG. 2.

Referring now to FIG. 3, there is shown results of performance tests on an embodiment of a plasma cell 11 constructed in accordance with the principles of the present invention. In FIG. 3 the test results are shown plotted as probability of plasma initiation (laser power limiting) versus relative incident laser flux. The graph reflects performance with and without nuclear initiation radiation.

The reduction to practice experiments were conducted with the plasma cell 11 shown in FIG. 2 using high pressure argon gas of up to 5 atmospheres pressure and using a nuclear initiation source of $Ni^{63}$. A short pulse, TEA $CO_2$ laser, representing a threat pulse, was focused into the plasma cell 11. The laser pulse width was 80 nsec with a 10 nsec rise time and total energy of 500 mJ maximum. Data was collected in two ways. The probability of plasma initiation was noted as a function of input laser energy. In this way the initiation threshold was clearly determined. Second, the ratio of output energy transmitted through the plasma cell 11 to input energy to the plasma cell 11 was noted to determine the attenuation threshold.

The results shown in FIG. 3 clearly show that the initiation threshold is reduced markedly in the presence of a nuclear source 14. The reduction observed experimentally varies from 20 to 50. In terms of detector protection, a probability greater than about 90% is required. In terms of attenuation ratio, it was found that laser energy transmitted through the plasma cell 11 was reduced by a factor of about 10–20 in the presence of the plasma. This attenuation factor is similar for all points on the graph of FIG. 3.

It is important to note that the nuclear source 14 acts as a source for pre-ionization of the ionizable gas 12, similar to a high voltage discharge. However, because of the very high energy of the primary electrons, low ionization potential species such as metastables and excimers are also generated and that the presence of these species helps to lower the breakdown threshold. The nuclear source 14 is unique in this regard and this factor may be exploited to tailor threshold for various applications.

Thus there has been described a new and improved laser plasma switch for use in attenuating laser threat radiation in order to protect detector elements, and the like. The properties of the gas plasma switch include negligible insertion loss, fast rise time on order of 5 nsec, passive operation using laser initiated plasma and requiring no input power, there is no requirement for threat sensing, it is ready for operation at all times, and provides broadband protection for all wavelengths greater than about 1 μm.

It is to be understood that the above-described embodiment is merely illustrative of one of the many specific embodiments which represent applications of the principles of the present invention. Clearly, numerous and other arrangements can be readily devised by those skilled in the an without departing from the scope of the invention.

What is claimed is:

1. A gas plasma switch comprising:
   a chamber containing a gas under pressure;
   optically transmissive windows disposed at opposite ends of the chamber that permit passage of light therethrough; and
   a radiation source disposed in the chamber and adapted to discharge particles into the chamber that are adapted to pre-ionize the gas disposed in the chamber such that a critical density of particles is created that is adapted to initiate a laser-induced plasma that reflects, absorbs and deflects laser radiation such that its intensity is attenuated.

2. The gas plasma switch of claim 1 in which the gas in an inert gas.

3. The gas plasma switch of claim 2 in which the gas is argon.

4. The gas plasma switch of claim 3 in which the argon gas is under a pressure of up to five atmospheres.

5. The gas plasma switch of claim 1 in which the windows are made of zinc selenide.

6. The gas plasma switch of claim 5 in which the windows are coated with an anti-reflective coating.

7. The gas plasma switch of claim 1 in which the radiation source is $Ni^{63}$.

8. The gas plasma switch of claim 1 which further comprises means for focussing applied energy, thereby creating a secondary focal point within the chamber at a location substantially adjacent the radiation source.

9. The gas plasma switch of claim 8 wherein the radiation source is disposed substantially next to the secondary focal point and adapted to inject particle matter into a volume of gas substantially centered on the secondary focal point.

10. The gas plasma switch of claim 1 which further comprises first and second lenses disposed along an optical path traversed by the image scene and adapted to focus energy to a focal spot within the chamber and image light energy transmitted through the chamber onto a detector.

11. A protective device interposed between an image scene and a detector, and adapted to protect against laser radiation from a laser source, said device comprising:
    a chamber having opposing end walls and containing a gas under pressure;
    windows disposed in the opposing end walls of the chamber tha permit passage of light through the chamber; and
    a radiation source disposed within the chamber and adapted to radiate particles into the gas to pre-ionize the gas that is traversed by laser radiation, and wherein incident high intensity laser radiation entering the chamber encounters a critical density of said particles and initiates a laser-induced plasma that reflects, absobs and deflects the laser radiation such that its intensity is attenuated.

12. The protective device of claim 11 in which the gas is an inert gas.

13. The protective device of claim 12 in which the gas is argon.

14. The protective device of claim 13 in which the argon gas is under a pressure of about five atmospheres 15. The protective device of claim 11 in which the windows are made of zinc selenide.

16. The protective device of claim 15 in which the windows are coated with an anti-reflective coating.

17. The protective device of claim 11 which further comprises means for focusing applied laser radiation within the chamber at a point substantially adjacent the electrodes.

18. The protective device of claim 11 which further comprises first and second lenses disposed along an optical path traversed by the image scene and adapted to focus energy to a focal spot within the chamber and image light energy transmitted through the chamber onto a detector.

* * * * *